United States Patent
Moyer, Jr.

[15] 3,671,499
[45] June 20, 1972

[54] LACTAM POLYMERIZATION WITH ALLOPHANOYL HALIDE INITIATORS

[72] Inventor: Charles E. Moyer, Jr., Charleston, W. Va.

[73] Assignee: Union Carbide Corporation, New York, N.Y.

[22] Filed: July 9, 1970

[21] Appl. No.: 53,683

[52] U.S. Cl. ............................................. 260/78 L, 260/78 P
[51] Int. Cl. .................................. C08g 20/12, C08g 20/18
[58] Field of Search ................................... 260/78 L, 78 P

[56] References Cited

UNITED STATES PATENTS

| | | | |
|---|---|---|---|
| 3,148,174 | 9/1964 | Glickman et al. | 260/78 P |
| 3,216,976 | 11/1965 | Schwartz et al. | 260/78 L |
| 3,455,885 | 7/1969 | Oka et al. | 260/78 L |
| 3,562,221 | 2/1971 | Steinhofer et al. | 260/78 L |

OTHER PUBLICATIONS

Falkenstein et al., Die Makromolekulare Chemie 127 (1969) pp. 34–53

*Primary Examiner*—William H. Short
*Assistant Examiner*—L. M. Phynes
*Attorney*—Paul A. Rose, Aldo John Cozzi, Gerald R. O'Brien, Jr. and James J. O'Connell

[57] ABSTRACT

An allophanoyl halide compound is used as an initiator or activator with alkaline catalyst in the anionic polymerization of lactam monomer so as to provide for a rapid polymerization process.

11 Claims, No Drawings

LACTAM POLYMERIZATION WITH ALLOPHANOYL HALIDE INITIATORS

BACKGROUND OF THE INVENTION

1. Field of the Invention

The invention relates to the anionic polymerization of lactam monomer.

2. Description of the Prior Art

In the anionic polymerization of lactams there is usually employed a catalyst/initiator system. The catalyst is commonly a material which will form an alkali or alkaline earth metal salt of the lactam.

Although there are a number of materials known to those in the art as initiators for such reactions, many of such initiators are not commercially useful because they either do not provide polymerization rates which are fast enough in the various types of molding equipment and processes which are used commercially and which require fast processing conditions, or the products produced with such initiators do not have commercially acceptable physical properties.

SUMMARY OF THE INVENTION

Lactams are anionically polymerized utilizing a catalyst-initiator system whereby the lactam may be readily polymerized in a relatively short period of time to produce commercially acceptable polymers. The polymerization system contains an anionic catalyst and, as the initiator or activator, one or more allophanoyl halide compounds.

An object of the present invention is to provide an anionic polymerization process whereby lactams may be readily polymerized in a relatively short period of time to provide high molecular weight nylon polymers.

Another object of the present invention is to provide a novel initiator or activator system for use in the anionic polymerization of lactam monomers.

DESCRIPTION OF THE PREFERRED EMBODIMENT

It has now been found that lactams may be polymerized anionically so as to provide the objects of the present invention if there is employed as the catalyst/initiator system for such polymerization an anionic catalyst and, as an initiator or activator, one or more allophanoyl halide compounds.

THE LACTAMS

The lactams which may polymerized according to the present invention are all those which are capable of being polymerized anionically and are preferably those lactam monomers which contain at least one ring group of the structure

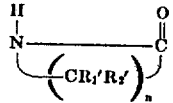

wherein $n$ is a whole number which is 3 to 15, and preferably 3 to 10, and $R_1'$ and $R_2'$ may be the same or different radicals on each carbon atom and may be H or $C_1$ to $C_{10}$ hydrocarbon.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis lactams of the formula:

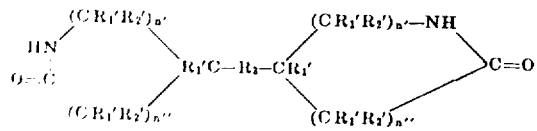

wherein $n'$ and $n''$ are each whole numbers such that $n'$ and $n''$ is 2 to 14; $R_1'$ and $R_2'$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulae:

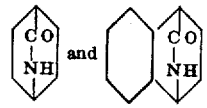

The lactams to be polymerized can be used individually or in any combination thereof.

THE INITIATORS

The initiator which is to be employed in the process of the present invention is a compound having the structure

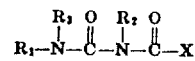

wherein $R_1$, $R_2$, and $R_3$ may be the same or different monovalent radicals which may be H, or $C_1$ to $C_{20}$, and preferably $C_1$ to $C_{10}$, saturated or unsaturated hydrocarbon radicals or heterocyclic radicals containing one to 20, and preferably one to 10 carbon radicals and one or more other radicals in the heterocyclic ring such as O, N and S, $R_1$, and $R_2$ may also be linked to form a divalent radical of the structure $-(CH_2)_n-$ wherein $n$ is a whole number of 1 to 10, and X is Cl, F, Br or I.

The hydrocarbon and heterocyclic radicals may be substituted with one or more substituents which are inert to the other components of the anionic polymerization systems of the present invention and to the components of the reaction systems in which they are prepared.

The hydrocarbon radicals may be aliphatic (linear, branched or cyclic) or aromatic (aralkyl or alkaryl) in nature. The preferred hydrocarbon radicals are aliphatic radicals, such as methyl, ethyl, propyl, isopropyl, n-butyl, t-butyl, n-pentyl, n-decyl, 2-methyl-hexyl-1; and dodecy; or phenyl.

These initiator compounds of the present invention may be generally characterized as allophanoyl halides.

These allophanoyl halides may be prepared as disclosed in U.S. Pat. No. 3,337,621 and by Ulrich et al. in Journal of Organic Chemistry, 29, 2401–4 (1964).

Examples of these initiators are 2,4-dimethyl allophanoyl chloride, i.e., $CH_3NH-CO-NCH_3-COCl$; 2-methyl,4-(n-butyl)-allophanoyl chloride, i.e., $n-C_4H_9NH-CO-NCH_3-COCl$; 2-methyl,4-(o-chlorophenyl) allophanoyl chloride, i.e., $ClC_6H_4NH-CO-NCH_3-COCl$; 2-ethyl, 4-phenyl allophanoyl chloride, i.e., $C_6H_5NH-CO-NC_2H_5-COCl$; 2-methyl, 4-(o-tolyl) allophanoyl chloride and ethylene allophanoyl chloride, i.e.,

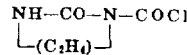

The initiators of the present invention may be used individually or in combination with one another or with one or more other initiators. About 0.1 to 10 moles of initiator are employed per 100 moles of lactam monomer being polymerized.

THE POLYMERS

The use of the initiators of the present invention results in the preparation of polymers by the following reactions:

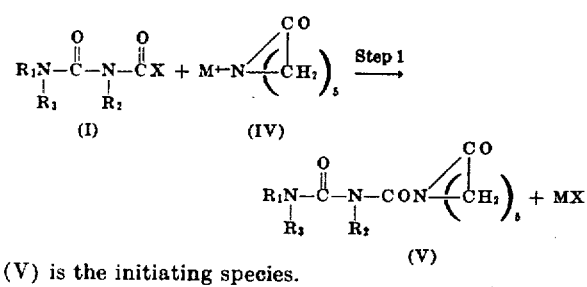

(V) is the initiating species.

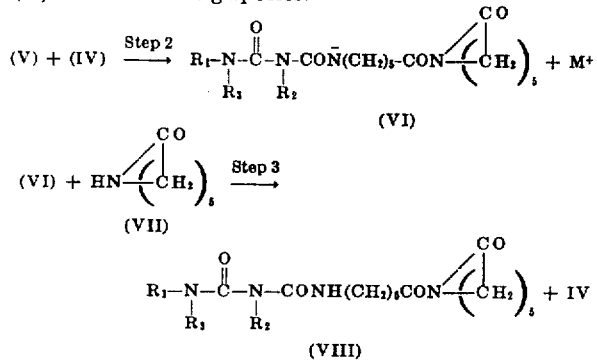

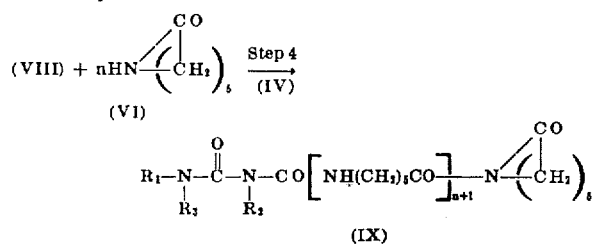

Step 1, which forms the initiator, consumes a part of the catalyst. Thus, an excess of catalyst (relative to the amount of initiator) must be used. The catalyst that is consumed in Step 2 is regenerated in step 3.

Finally:

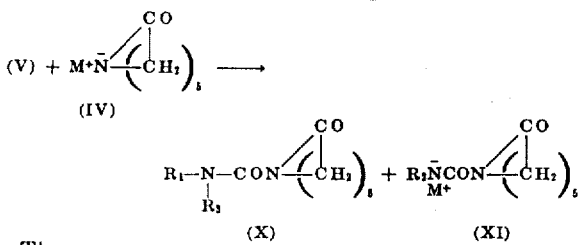

Intermediate (V) may also undergo another reaction:

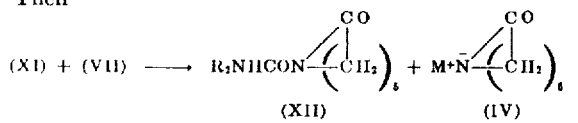

Then

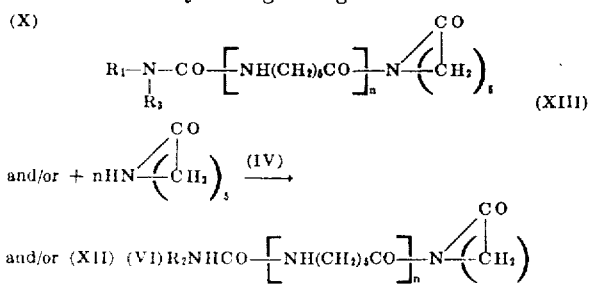

Thus the catalyst is again regenerated.

(X)

$$R_1-N-CO-[NH(CH_2)_5CO]_n-N\diagup\!\!\!\!\!\!\underset{(CH_2)_5}{\overset{CO}{|}}$$
$$\quad\; R_3 \qquad\qquad\qquad\qquad\qquad\qquad\qquad (XIII)$$

and/or $+ nHN\diagup\!\!\!\!\!\!\underset{(CH_2)_5}{\overset{CO}{|}}\quad (IV)$ and/or (XII) (VI) $R_2NHCO-[NH(CH_2)_5CO]_n-N\diagup\!\!\!\!\!\!\underset{(CH_2)_5}{\overset{CO}{|}}$ (XIV)

Therefore the final nylon product may be (IX), (XIII), (XIV), or a mixture of these.

The foregoing mechanism was shown for the case when ε-caprolactam is polymerized. With other lactams, the reaction schemes are similar.

Thus a generalized reaction for all lactams may be shown by replacing the moiety $(CH_2)_5$ in the structures shown above with the moiety R' wherein R' would represent that portion of the structure of the lactam being polymerized which lies between the nitrogen atom and the carbonyl carbon atom of such lactam. In such reaction scheme, also $R_1$, $R_2$, $R_3$ and X are as defined above, M is the cation of the anionic catalyst, and n is a whole number which is >1 and is such that the polymers produced in the resulting polymeric system are normally solid, i.e., solid at temperatures of about 25° C., and have reduced viscosities in m-cresol (0.1 grams/100 ml.) at 25° of >0.4, and preferably about 0.8 to 7, deciliters/gram.

The value of n may vary somewhat in each polymerized lactam chain, and will be about 10 to about 5,000. The polymers would thus have molecular weights of about 1,000 to 500,000 or more.

The lactam polymers prepared with the allophanoyl halide initiators of the present invention have good physical properties.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organometallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium naphthyl, and sodamide; Grignard reagents such at ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, and preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100° to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°-250° C, depending on the lactam(s) employed, and the polymerization temperature. The bulk polymerization reaction should be carried out under anhydrous conditions, i.e., in the presence of no more than about 0.3 weight percent; and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the insitu formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of above 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130° to 240° C. in dispersion systems such as those disclosed in U.S. Pat. Nos. 3,061,592 and 3,383,352, and by G.B. Gechele and G.F. Martins in J. Applied Polymer Science 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for intended purpose. Thus, a stabilizer would be used in a stabilizingly effect quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

The general procedure employed for the polymerization of $\epsilon$-caprolactam in the Examples herein is as follows. Into each of two 25 × 200 mm test tubes was added 28.3 gm. (0.25 mole) of dry ( >0.03 percent $H_2O$) molten $\epsilon$-caprolactam, and both were then heated at the desired polymerization temperature. Sodium hydride in the form of a dispersion (57 percent) in mineral oil was added to one of these test tubes, while the initiator was added to the other. After solutions were formed and equilibrated with the bath temperature they were mixed, and a thermocouple was inserted in the resulting mixture. The progress of the polymerization was followed both visually and by observing the reaction temperature which, due to the exotherm of the polymerization, rises initially. Thus, the rate with which the reaction reaches peak temperature is an indication of the polymerization rate. The time required for the development of opacity was taken as an indication of the time required for crystallization of the Nylon 6 formed.

EXAMPLE 1

The initiator used was 2,4-dimethyl allophanoyl chloride. The initiator concentration was 0.67 mole percent and the catalyst concentration was 2 mole percent. The polymerization was conducted at 140° C. After 3.5 minutes it was observed that the poly($\epsilon$-caprolactam) had crystallized. When the heating cycle of 5 minutes was complete, the polymer was allowed to cool to room temperature. It was then analyzed for residual monomer by gas chromatography. A value of 2.15 percent monomer content was determined which demonstrates that a very high degree of conversion was achieved. The polymer had a reduced viscosity (R.V.) (0.1 gm/100 ml. m-cresol at 25° C) of 1.41 dl/gm. The color of the polymer was a good off-white color.

EXAMPLES 2-6

Using the procedure noted above various allophanoyl halide compounds were tested as $\epsilon$-caprolactam polymerization initiators. The polymerization reactions were conducted at 150° C. using 2 mole percent of NaH as catalyst and 0.5 mole percent of the allophanoyl halide compound as initiator. The polymers produced had a good off-white color. The speed with which these compounds functioned as initiators is disclosed in Table I below, which lists the initiator used, and the resulting no flow time and crystallization time achieved with each of such initiators.

TABLE I

| Example | Initiator | No flow time, minutes | Crystallization time, minutes |
| --- | --- | --- | --- |

| 2 | 2-methyl-4-(n-butyl) allophanoyl chloride | 3 | 4.5 |
| 3 | 2-ethyl-4-phenyl allophanoyl chloride | 3 to 3.5 | 4 |
| 4 | 2-methyl-4-(o-chlorophenyl) allophanoyl chloride | 3 to 3.5 | 3.5 to 5 |
| 5 | 2-methyl-4-(o-tolyl) allophanoyl chloride | 5.5 | 5 to 6 |
| 6 | ethylene allophanoyl chloride | 1.5 | 2 |

What is claimed is:

1. A process for anionically polymerizing a lactam monomer containing 5 to 17 members in the ring structure thereof to a moldable polymer with 0.2 to 20 mole percent of an anionic lactam polymerization catalyst based on the moles of monomer being polymerized and 0.1 to 10 mole percent of an anionic lactam polymerization initiator based on the moles of monomer being polymerized which comprises using as said initiator at least one allophanoyl halide compound having the structure $$R_1-\underset{\underset{H}{|}}{N}-\underset{\underset{}{\overset{\overset{O}{\|}}{C}}}{}-\underset{\underset{R_2}{|}}{N}-\underset{\underset{}{\overset{\overset{O}{\|}}{C}}}{}-X$$

wherein $R_1$, $R_2$, and $R_3$ may be the same or different monovalent radicals and are H or $C_1$ to $C_{20}$ hydrocarbon radicals which are unsubstituted or substituted with substituents which are inert to the other components of the polymerization system and X is Cl, Br, F or I.

2. A process as in claim 1 in which said lactam monomer comprises ε-caprolactam.

3. A process as in claim 1 in which X is Cl.

4. A process as in claim 3 in which R1 and R2 are unsubstituted hydrocarbon radicals.

5. A process as in claim 4 in which said allophanoyl halide is 2,4-dimethyl allophanoyl chloride.

6. A process as in claim 4 in which said allophanoyl halide is 2-methyl-4-(n-butyl) allophanoyl chloride.

7. A process as in claim 4 in which said allophanoyl halide is 2-ethyl-4-phenyl allophanoyl chloride.

8. A process as in claim 4 in which said allophanoyl halide is 2-methyl-4-(o-tolyl) allophanoyl chloride.

9. A process as in claim 4 in which said allophanoyl halide is ethylene allophanoyl chloride.

10. A process as in claim 3 in which $R_1$ or $R_2$ is a substituted hydrocarbon radical.

11. A process as in claim 10 in which said allophanoyl halide is 2-methyl-4-(o-chlorophenyl) allophanoyl chloride.

* * * * *

UNITED STATES PATENT OFFICE
CERTIFICATE OF CORRECTION

Patent No. 3,671,499        Dated June 20, 1972

Inventor(s) C. E. Moyer, Jr.

It is certified that error appears in the above-identified patent and that said Letters Patent are hereby corrected as shown below:

Column 3, lines 61-73, the reaction sequence should read as follows:

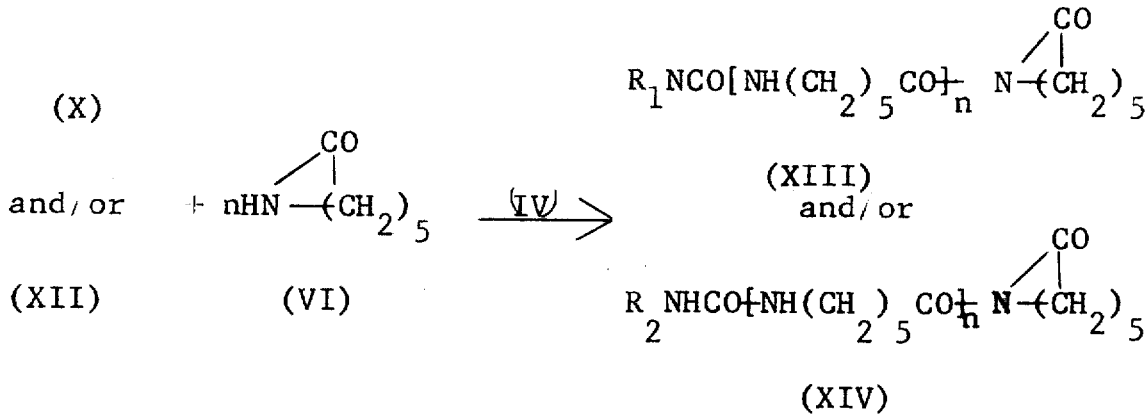

Column 6, line 10, "effect" should read --effective--.

Column 6, line 26, "$\geq 0.03$" should read --$\leq 0.03$--.

Signed and sealed this 5th day of December 1972.

(SEAL)
Attest:

EDWARD M. FLETCHER, JR.
Attesting Officer

ROBERT GOTTSCHALK
Commissioner of Patents